US009718988B2

(12) United States Patent
Brinkhuis et al.

(10) Patent No.: US 9,718,988 B2
(45) Date of Patent: Aug. 1, 2017

(54) CROSSLINKABLE COMPOSITION COMPRISING A LATENT BASE CATALYST AND LATENT BASE CATALYST COMPOSITIONS

(71) Applicant: NUPLEX RESINS B.V., Bergen Op Zoom (NL)

(72) Inventors: Richard Hendrikus Gerrit Brinkhuis, Zwolle (NL); Antonius Johannes Wilhelmus Buser, Wehl (NL); Jan Andre Josef Schutyser, Dieren (NL); Michael Antony Gessner, La Grange, KY (US)

(73) Assignee: ALLNEX NETHERLANDS B.V., Bergen Op Zoom (NL)

( * ) Notice: Subject to any disclaimer, the term of this patent is extended or adjusted under 35 U.S.C. 154(b) by 0 days.

(21) Appl. No.: 14/246,267

(22) Filed: Apr. 7, 2014

(65) Prior Publication Data

US 2014/0220252 A1 Aug. 7, 2014

Related U.S. Application Data

(63) Continuation of application No. PCT/EP2012/069798, filed on Oct. 5, 2012.

(30) Foreign Application Priority Data

Oct. 7, 2011 (EP) .................... 11184388

(51) Int. Cl.
*B05D 3/02* (2006.01)
*C09D 167/00* (2006.01)
*C08K 5/04* (2006.01)
*B01J 31/02* (2006.01)

(52) U.S. Cl.
CPC ........ *C09D 167/00* (2013.01); *B01J 31/0205* (2013.01); *B01J 31/0239* (2013.01); *B01J 31/0268* (2013.01); *C08K 5/04* (2013.01); *B01J 2231/341* (2013.01)

(58) Field of Classification Search
CPC ...... C09D 167/00; C08K 5/04; B01J 31/0205; B01J 31/0239; B01J 31/0268; B01J 2231/341
USPC ...................................... 427/385.5
See application file for complete search history.

(56) References Cited

U.S. PATENT DOCUMENTS

| 2,635,100 A | 4/1953 | Werntz |
| 4,938,980 A * | 7/1990 | Arciszewski ............ A21D 2/02 426/553 |
| 6,989,459 B2 | 1/2006 | Walker |

FOREIGN PATENT DOCUMENTS

| CN | 1309683 A | 8/2001 |
| CN | 101869844 A | 10/2010 |
| CN | 101879457 A | 11/2010 |
| EP | 0448154 A1 | 3/1991 |
| WO | 9958608 A1 | 11/1999 |
| WO | 2011124663 A1 | 10/2011 |

OTHER PUBLICATIONS

Noomen—Progress in Organic Coatings 32, 1997, p. 137-142.
T. Jung et al.—Farbe und Lacke Oct. 2003.
International Search Report PCT/EP 2012/069798.

* cited by examiner

*Primary Examiner* — Robert S Walters, Jr.
(74) *Attorney, Agent, or Firm* — Ramin Amirsehhi; David P. Owen; Hoyng Rokh Monegier LLP

(57) ABSTRACT

A crosslinkable composition including at least one crosslinkable component that is crosslinkable under the action of a base catalyst, a first carbonate salt according to a first formula as latent base crosslinking catalyst, and a second carbonate salt according to a second formula as potlife extender, wherein the second carbonate is present in an amount of at least 5 mole % and preferably at most 500 mole % relative to the molar amount of the first carbonate. Further disclosed are catalyst compositions composed of the first and second carbonate salts, to the use of the catalyst composition as base catalyst system in crosslinkable compositions and the crosslinkable compositions, in particular coating compositions comprising the catalyst composition.

20 Claims, No Drawings

CROSSLINKABLE COMPOSITION COMPRISING A LATENT BASE CATALYST AND LATENT BASE CATALYST COMPOSITIONS

CROSS REFERENCE TO RELATED APPLICATIONS

This application is a continuation of PCT application number PCT/EP2012/069798 filed on 5 Oct. 2012, which claims priority from European application number 11184388.4 filed on 7 Oct. 2011. Both applications are hereby incorporated by reference in their entireties.

BACKGROUND OF THE INVENTION

1. Field of the Invention

The present invention relates to a cross-linkable composition crosslinkable by Real Michael Addition (RMA) reaction comprising a latent base catalyst composition and to an improved catalyst composition for use in crosslinkable compositions, in particular RMA cross-linkable compositions, which catalyst composition provides improved pot life. The invention further relates to the use of said catalyst composition for curing crosslinkable compositions, in particular cross-linkable coating compositions, at low temperatures, to a process for preparing a coating composition and for preparing a coating and to coatings obtainable by said process.

A composition crosslinkable by Real Michael Addition (RMA) reaction comprises a component with at least 2 activated unsaturated groups and a component with at least 2 acidic protons C—H in activated methylene or methine groups, that can react and crosslink to each other in the presence of a strong base catalyst. The advantage of RMA crosslinkable compositions in general is that they have a very high curing reaction speed even at room temperature, and can give good film properties, while requiring low VOC levels.

The crosslinkable composition is a 2-K system, which implies that the crosslinking catalyst is added to and mixed with the crosslinkable components shortly before use. From the moment of mixing, the crosslinking composition is potentially reactive and may start to crosslink. Such crosslinking compositions can be used only relatively shortly before the extent of viscosity build-up is such that the composition can no longer be used well. This effective use time is called the potlife. The potlife is generally considered ended when the viscosity becomes unacceptably high. It depends on the criticality of the application what viscosity is unacceptable. For example spraying is more critical than brushing. A central challenge in developing coating systems, especially those that are cured at low to moderate temperatures, is achieving a good balance between on one hand rapid hardening and crosslinking during application (also referred to as "curing" or "drying") and on the other hand maintaining long pot lives, i.e. the ability to work with the paint without problems for a reasonable amount of time after preparation, at least an hour, but preferably much more.

For high solids systems containing less solvent to evaporate upon application, this challenge is significantly greater than for low or medium solids systems containing more volatile solvent. High solids systems are preferred or required by law to reduce environmental burden, and/or exposure of the painter to harmful solvent vapours. The preferred solids content is at least 55 wt % (dry weight after crosslinking relative to the total weight of the crosslinking composition), preferably higher.

Coatings for applications in decorative, vehicle refinish, metal, plastic, marine or protective coatings e.g. require several hours of potlife enabling the applicator to bring the paint composition on a substrate in a well-controlled manner. The viscosity and low solvent content requirements for high solids systems force the resin designer to select resins of lower molecular weight and/or lower glass transition temperatures that will require more reaction with a crosslinker to raise the Tg of the network to levels corresponding to a dry film, in the case of high solids paints. The lower amount of solvent used will create less "physical drying" effects of the film (physical hardening/reduced plastization due to the loss of solvent) than in paints using more volatile solvents, and also, the increase of the reaction rate going from paint to applied coating is less, because the increase of concentration of the reactive groups through the loss of solvent is less helpful. All these phenomena add to the problem that for high solids systems, a combination of fast drying and long pot life is very difficult to achieve, and much more so than in the case of medium or low solids systems.

A latent base crosslinking catalyst is used to increase this potlife, while allowing fast drying. A latent base catalyst becomes active predominantly only when the composition is applied, for example as a coating.

2. Description of the Related Art

The above described problem has been addressed by Noomen in Progress in Organic Coatings 32 (1997) 137-14 describing the use of latent base catalysed Michael addition as crosslinking reaction for high-solids polymer coating compositions of low VOC. Noomen describes several examples of crosslinking catalysts with the required basicity, for example the amidine types (such as tetra-methyl-guanidine) 1,5-diazabicyclo (4,3,0) non-5-ene (DBN), 1,8-diazabicyclo (5,4,0) undec-7-ene (DBN), tetra-butylammonium fluoride or in situ formed catalyst from a tertiary amine (like 1,4-diazabicyclo[2.2.2]octane: DABCO) with epoxy. Although such prior art catalysts might show quite acceptable curing behaviour in the RMA films, the short potlifes are too limited to get acceptable application times for rolling, brushing and spraying of the coatings, or the drying rate at lower curing temperatures is too low.

Noomen further describes that, although the film properties (such as durability when using malonate polyesters) looked promising, there were still severe shortcomings with this coating composition, in particular in the field of high solids coatings, because the curing under ambient and forced drying conditions revealed inhibition, speculatively assigned to the interaction of the carbon dioxide from the air with the strong base resulting in a tacky coating surface or inhibition by the interaction with the acidic groups of the substrate resulting in a low degree of cure or a minor adhesion. This was overcome by increasing the amount of catalyst but this resulted in a too short, unacceptable potlife, especially when using high solid formulations and in low temperature applications such as clear coats car refinishing, pigmented topcoats for marine, protective and aircraft, wood coatings, etc. Another problem was often the yellowing of the coating induced especially under stoving conditions.

EP0448154 (also from Noomen) describes to use certain carboxylic acids as a blocking agent for a strong basic catalyst. Although a longer potlife can be achieved, the basic catalyst with carboxylic acids as described in EP448514 provides an insufficient dust- and touch-drying behaviour and a low through-drying especially at ambient conditions. The prior art catalyst does not provide workable potlifes when inhibition problems are to be avoided and does not provide fast free-to-handle coatings, in particular for high solid coatings. Furthermore, deblocking of the catalyst blocked with e.g. carboxylic acids was only applicable at high temperatures.

BRIEF SUMMARY OF THE INVENTION

Therefore there is still a need for crosslinkable compositions having a high solid content comprising crosslinkable components, preferably RMA crosslinkable polymers, and a latent base crosslinking catalyst that yield a good potlife/drying balance, in particular a workable potlife and a good drying behaviour also at lower temperatures in coating compositions.

There is also a desire for crosslinkable compositions comprising a catalyst that can be simply cured in ambient conditions as opposed to for example compositions comprising photo-latent amine catalysts, known from T. Jung et al Farbe and Lacke October 2003. Such photo-latent amine catalysts that do generate a strong base on UV radiation, are not suitable for coating more complex irregular substrates where parts of the surfaces are not reachable with UV or visible light.

DESCRIPTION OF ILLUSTRATIVE EMBODIMENTS

According to the invention there is provided a crosslinkable composition comprising
a. 0.1-99 wt % of at least one crosslinkable component that is crosslinkable under the action of a base catalyst, (all wt % herein being relative to the crosslinkable composition),
b. a first carbonate salt according to formula 1 as latent base crosslinking catalyst, (meq latent base relative to dry total weight of the crosslinkable composition)

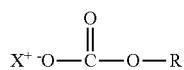

Formula 1 wherein X$^+$ represents a non-acidic cation and wherein R is hydrogen, alkyl, or aralkyl group, preferably in an amount of 0.001-0.3 meq/g solids and
c. a second carbonate salt according to Formula 2 as potlife extender:

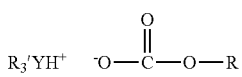

Formula 2 wherein Y is N or P and wherein each R' can be hydrogen, a substituted or unsubstituted alkyl, aryl or aralkyl group, wherein the second carbonate is present in an amount of at least 5 mole % and preferably at most 500 mole % relative to the molar amount of the first carbonate
d. optionally 0.1-70 wt % of solvent, preferably an organic solvent wherein at least 0.5 wt % (relation to total weight of the crosslinkable composition) is a primary alcohol and optionally comprising 0.1-10 wt % water
e. optionally 0.1-70 wt % of an organic carbonate component according to formula RO—C(=O)O—R wherein R preferably is an alkyl, preferably methyl or ethyl.

Further there is provided a catalyst composition for use as a latent base catalyst system in crosslinkable compositions in particular coating composition made from said crosslinkable composition, said catalyst composition being composed of
a. a first carbonate salt according to formula 1 as the latent base catalyst

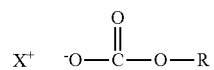

Formula 1 wherein X$^+$ represents a non-acidic cation and wherein R is hydrogen, alkyl, or aralkyl group and
b. a second carbonate salt according to Formula 2 as a potlife extender:

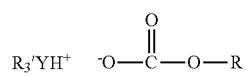

Formula 2 wherein Y is N or P, wherein each R' can be hydrogen, a (substituted) alkyl, aryl or aralkyl group, and wherein R can be the same or a different from the R in formula 1.
wherein the second carbonate is present in an amount of at least 5 mole % and preferably at most 500 mole % relative to the molar amount of the first carbonate.
c. optionally a solvent, preferably an organic solvent wherein at least 0.5 wt % (relation to total weight of the crosslinkable composition) is a primary alcohol and which optionally comprises 0.1-10 wt % water,
d. optionally an organic carbonate component according to formula RO—C(=O)O—R wherein R preferably is an alkyl, preferably methyl or ethyl.

The group Y is preferably nitrogen and can be part of a cyclic system including those where a N is linked with a double bond to a neighbouring atom. The R and R' group can be unsubstituted or substituted, but if it is substituted then it should not comprise substituents that substantially interfere with the crosslinking reaction as is known and can be easily established by the skilled person. In particular, acidic substituents, for example carboxylic acids, are preferably present only in insubstantial amounts and are most preferably not included. This similarly applies to substituents on the crosslinkable component and to cation X.

The first carbonate salt (a) is a latent base catalyst because on drying, the carbonate salt decomposes releasing carbondioxide to produce a strong base; either a hydroxide or an alkoxy, or aralkyloxy base. In a pot, in particular in a closed pot, the decomposition takes place only slowly, because the $CO_2$ cannot escape to shift the reaction equilibria to completion, resulting in a good (long) pot life, whereas during drying of the crosslinkable composition when applied as a coating layer, the base is regenerated quickly resulting in good curing rate upon escape of the $CO_2$ from the high surface area created.

The second carbonate salts (b) are not initiators for the intended RMA reaction by themselves, since they combine the potential basicity of the anion with an compensating acidic proton on the cationic species, thereby distinguishing from the catalyst carbonate which will generate strongly basic species upon evaporation of $CO_2$ which can initiate the RMA reaction. The second carbonate in contrast will not act as initiating catalysts but were found to act as pot life extenders. These second carbonate species, upon film formation, lose carbon dioxide and disintegrate in volatile species leaving the film, or remaining without harm. In the crosslinkable composition the cation of the first carbonate salt according to formula 1 preferably has a pKa of at least 11.5, preferably at least 12 and more preferably at least 12.5 and the cation of the second carbonate salt preferably has a pKa of less than 11.5, preferably less than 11. All pKa values herein are defined relative to water irrespective of whether the catalyst composition or the cross-linkable composition have water as solvent or an organic solvent. The pKa values of cations are all well reported or can be tested in the known manner with a "neutral" anion (e.g. chloride).

The inventors have surprisingly found that crosslinkable compositions comprising substituted carbonate salts as latent crosslinking catalysts in combination with the second carbonate salt as potlife improver provides very good results in providing good balance of longer pot-life even in high solids polymer coating compositions while at the same time having high curing rates during drying and desirably fast drying and hardness build-up behaviour under most if not all curing conditions. Higher amounts of catalysts can be used without significantly affecting the potlife and so the cross-linkable composition can be used in pot-applications of the coating by brushing or rolling or spraying. An extra advantage is the absence of yellowing even under high temperature stoving conditions.

The use of the second carbonate salt is a significant improvement over an alternative wherein pot life is improved by having an excess of acidic $CO_2$ as blocking species, because solubility of $CO_2$ is limited and such an excess would require keeping the composition in pressurized containers which is undesirable in practice. An advantage of the second carbonates is that they will not lead to an increased level of salts and hence will not increase sensitivity to polar components, because the second carbonate decomposes after application in a coating to three neutral species: $R_3NH^+ R^*OCO_2^- <->R_3N+HOR+CO_2$. These neutral species either are volatile and can escape from the coating, or can add to the network, or remain in the film as harmless neutral species. In a preferred embodiment of the second carbonate salt is ammoniumbicarbonate, because it decomposes in entirely neutral species ammonia, water and carbondioxide gas that all can evaporate from the coating (pKa ammonium cation=9.62). In another preferred embodiment, it is the bicarbonate of a protonated volatile tertiary amine, most preferably triethylamine (pKa=10.62).

The First Carbonate Salt

The latent base catalyst generally is a substituted carbonate salt according to formula 1

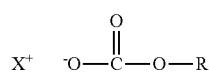

Formula 1 wherein X+ represents a nonacidic cation and wherein R is hydrogen, alkyl or aralkyl group. The cation must be non-acidic such that it does not interfere with the base catalyst and can for example be alkali metal, in particular lithium, sodium or potassium, but preferably is a quaternary ammonium or phosphonium carbonate salt according to formula 3,

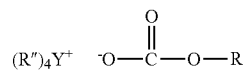

Formula 3 wherein Y represents N or P (preferably N), and wherein each R" can be a same or different alkyl, aryl or aralkyl group, wherein R and R" can be bridged to form a ring structure or R and/or R" can be a polymer. The R group in the first carbonate of the catalyst a) and/or of the second carbonate preferably is a hydrogen or an alkyl group which preferably is C1-C4 and most preferably methyl or ethyl. These simple alkyl carbonates can be prepared easily by reaction of corresponding hydroxides with dialkylcarbonates or by the reaction of tertiary amines with dialkylcarbonates in alcohols.

The catalyst can be a substituted carbonate salt according to formula 4, wherein R can be hydrogen, alkyl-, aryl- or aralkyl group or an oligomer or polymer.

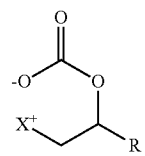

Formula 4

The catalyst can be incorporated into a polymer. R in formula 4 can be a polymer. Also X can be connected to a polymer, for example X can be a quaternary ammonium or phosphonium wherein one R' group is a polymer, which can for example be obtained by quaternising a polymer, preferably a polyacrylate, comprising a pending tertiary amine, preferably 2-(dimethylamino)ethylmethacrylate, with a dialkylcarbonate to form a quaternary ammonium carbonate according to formula 1, 3 or 4. Details of the catalysts a) that can be used are described in non-prepublished application PCT/EP2011/055463 and are herewith incorporated by reference.

In the catalyst composition the catalyst is preferably present in an amount of at least 0.01, preferably at least 0.2, more preferably at least 0.4 meq/gr cat composition.

The preparation of the quaternary ammonium carbonates is well known in the art. U.S. Pat. Nos. 6,989,459 and 452,635,100, describe a process for an in situ method of preparing quaternary ammonium methylcarbonate salts and quaternary ammonium alkylcarbonate salts in high yield from tertiary amines, methanol, and at least one of a cyclic carbonate, an aliphatic polyester, and an ester, and their subsequent conversion to quaternary ammonium bicarbonates, quaternary ammonium carbonates or both in a one-pot reaction.

Quaternisation of trialkylamine with dialkylcarbonate or cyclic carbonate leads at a high temperature under autogeneous conditions to components of formula 1. Polymers containing tertiary amine groups can also be quaternized with e.g. dimethylcarbonate to a quaternized polymeric ammonium methylcarbonate salt. Using 2-(dimethylamino) ethylmethacrylate (MADAM) as sole monomer or as comonomer in polyacrylates offers a means to get polymers containing tertiary amines suitable for quaternisation with dimethylcarbonate. Many others are possible such as epoxy containing resins modified with secondary amines or isocyanate containing products treated with e.g. 2-dimethylaminoethanol. The described prior art processes and a novel process are herewith incorporated by reference.

A preferred way to synthesize the catalyst is by reaction of the quaternary ammonium hydroxide with dialkylcarbonate to form a catalyst according to formula 1 or 3 or cyclic carbonate according to formula 4. This is done at room temperature by mixing some molar excess of liquid carbonate with a solution of the ammonium base. The blocking (conversion of hydroxide to alkylcarbonate) can be shown by means of titration with aqueous HCl titration: for the blocked catalyst an equivalence point at a lower pH is found.

The Second Carbonate Salt

In the catalyst composition the second carbonate b) is present in an amount of at least 5 mole % and preferably at most 500 mole % relative to the molar amount of the first carbonate catalyst (a). Preferably the molar amount of second carbonate b) is at least 10, 20 or 40 mole % and preferably at most 200, 150 and 100 mole % (100% means same molar amount of the first carbonate catalyst a) and potlife extender b).

In a most preferred embodiment the cation in the second carbonate component is a protonated amine. The protonated amine can be a tertiary amine, a secondary amine, a primary amine, ammonia or a heterocyclic amine. Most preferably the amine is a volatile amine. In a preferred embodiment, it is ammonia; in another preferred embodiment it is a volatile tertiary amine (e.g. triethylamine)

The anion in the second carbonate preferably is an alkylcarbonate or a bicarbonate, most preferably it is a bicarbonate. In case of alkylcarbonate the alkyl preferably is ethyl or methyl. Most preferably, the second carbonate is ammonium bicarbonate ($NH_4HCO_3$).

The catalyst composition may further comprises an organic carbonate component RO—C(=O)O—R wherein R is alkyl, aryl or aralkyl, preferably an alkyl, preferably methyl or ethyl, wherein the molar ratio of the organic carbonate component to the first carbonate catalyst is 0.01-50, preferably 0.1-20, more preferably 0.15-10, most preferably 0.25 to 6. It was found that the organic carbonate component acts as a storage shelflife improver for the catalyst composition. It may improve storage stability by counteracting premature loss of carbondioxide during storage, by allowing reformation of the blocked species. This organic carbonate can act as solvent and be part of the solvent of the crosslinkable composition and thus can be present in substantial amount.

Depending on the choice of the crosslinkable components, in particular components A and B in the RMA system (introduced later), the crosslinkable composition can have a certain amount of an organic solvent or can have no solvent at all. However, the inventors found that particular and unexpected advantage in open time and hardness development can be achieved if in the crosslinkable composition at least part of the solvent is a primary alcohol solvent. The primary alcohol solvent may be included in the catalyst composition which is added to the crosslinkable components before application. The solvent for the crosslinkable components can be a mixture of a non-alcoholic solvent and an alcohol solvent. Preferably, the alcohol is present in an amount of at least 1, preferably 2, more preferably 3, most preferably at least 5, even more preferably at least 10 wt % relative to the total weight of the crosslinkable composition and in view of VOC constraints preferably at most 45, preferably at most 40 wt %.

The alcohol solvent preferably is one or more primary alcohols, more preferably a mono-alcohol having 1 to 20, preferably 1-10, more preferably 1-6 carbon atoms, preferably selected from the group of ethanol, n-propanol, n-butanol, n-amyl alcohol and butylglycol. Methanol is less preferred because of the health, environmental and safety risks.

The catalyst composition may further comprise water in amount between 0.1-80 wt %, preferably 1-50 wt % relative to total weight of the catalyst composition. It was found that, also in case the solvent is organic solvent, a little amount of water in some cases may have a significant improving effect on pot life. It is particularly preferred that the catalyst composition comprise both an organic solvent at least part of which is a primary alcohol and water, preferably from 0.1-10 wt %.

The catalyst composition according to the invention comprises
a. 0.1-50 wt % of a first carbonate salt catalyst according to formula 1 (all wt % herein being relative to the catalyst composition), and
b. 0.1-50 wt % of a second carbonate salt according to Formula 2 wherein the second carbonate is present in an amount of at least 5 mole % and preferably at most 500 mole % relative to the molar amount of the first carbonate catalyst.
c. optionally 0.1-99.8 wt % of solvent, preferably an organic solvent wherein preferably at least part is a primary alcohol,
d. optionally 0.1-50 wt % of an organic carbonate component according to formula RO—C(=O)O—R wherein each R is a same or different alkyl, preferably methyl or ethyl,
e. optionally 0.1-99.8 wt % water.

The catalytic composition can be made simply by mixing the components as described together for later use as a crosslinking catalyst by mixing the catalytic composition with crosslinkable components. It is noted that the water and primary alcohol have an effect on the catalytic activity and the pot-life versus drying rate balance and hence are considered part of the catalytic system and described as part of the catalytic composition, but in practice one or more of the optional components of the catalyst composition can be present in or added separately or in combinations to the crosslinkable components at any suitable time before mixing the crosslinkable components with the crosslinking catalyst and/or the use thereof.

The invention also relates to the use of the above described catalyst composition according to the invention as a crosslinking catalyst in a low temperature curing coating composition, preferably in a RMA curable coating composition, curable between 0 and 80° C., preferably 5 to 60° C., most preferably between 5 and 30° C.

The Crosslinkable Composition

The invention relates to a crosslinkable composition comprising
a. 0.1-99 wt % of at least one crosslinkable component, preferably a RMA crosslinkable component (all wt % herein being relative to the crosslinkable composition),
b. a first carbonate salt according to formula 1, (meq latent base relative to dry total weight of the crosslinkable composition)

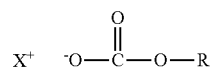

Formula 1 wherein $X^+$ represents a non-acidic cation and wherein R is hydrogen, alkyl, or aralkyl group, preferably in an amount of 0.001-0.3 meq/g solids and c. a second carbonate salt according to Formula 2 as pot life extender:

Formula 2

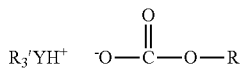

wherein Y is N or P and wherein each R' can be hydrogen, a (substituted) alkyl, aryl or aralkyl group, wherein the second carbonate is present in an amount of at least 5 mole % and preferably at most 500 mole % relative to the molar amount of the first carbonate catalyst,
d. optionally 0-70 wt % of solvent, preferably an organic solvent wherein preferably at least 0.5 wt % (relation to total weight of the crosslinkable composition) is a primary alcohol and optionally comprising 0.1-10 wt % water
e. optionally 0-70 wt % of an organic carbonate component according to formula RO—C(=O)O—R wherein R preferably is an alkyl, preferably methyl or ethyl Good results were obtained in crosslinkable compositions having a very high solid content, preferably at least 55, 60, 65 or even more than 70 or more than 75 wt % (dry weight after crosslinking relative to the total weight of the cross-linking composition). It is noted that the solids content relates to the crosslinking composition as described in the claim not including optional particulate fillers or pigments that maybe added at a later stage for example when making a coating composition.

In a most preferred embodiment the at least one cross-linkable component comprise reactive components A and B, each comprising at least 2 reactive groups, wherein the at least 2 reactive groups of component A are acidic protons (C—H) in activated methylene or methine groups and the at least 2 reactive groups of component B are activated unsaturated groups (C=C) and said catalyst composition for starting crosslinking reaction by Real Michael Addition (RMA) upon deblocking of the latent base catalyst by evaporation of carbon dioxide.

Reactive components A and B can be separate molecules and each independently in the form of polymers, oligomers, dimers or monomers. Reactive components A, B and/or the catalyst can be combined in one or more molecules. The activated C—H group in component A is preferably a malonate, acetoacetate or acetylacetone or mixtures thereof, more preferably dominantly malonate. In the crosslinkable composition preferably at least 50%, preferably at least 70%, more preferably at least 80% and even more preferably at least 90% of the acidic protons (C—H) in activated methylene or methine groups in crosslinkable component A come from malonate.

The concentrations and stoichiometry of the reactive groups in the cross-linkable components is chosen in a way to create good network properties in an efficient way. Typically, the ratio of reactive C—H groups (A) over C=C groups (B) is between 0.1 and 10, preferably between 0.5 and 3, more preferably between 0.7 and 2, most preferably between 0.8 and 1.5.

Preferably the component B comprises an unsaturated acryloyl or maleate functional group, preferably acryloyl. The crosslinkable composition preferably comprises as component A a polymer, preferably a polyester, polyurethane, acrylic or polycarbonate or a mixture/hybrid of these and as component B an unsaturated acryloyl functional component. The latent crosslinking catalyst is utilized in an amount ranging between 0.001 and 0.3 meq/g solids mole, preferably between 0.01 and 0.2 meq/g solids, more preferably between 0.02 and 0.1 meq/g solids (meq/g solids defined as moles latent base relative to the total dry weight of the crosslinkable composition).

In the crosslinkable composition the reactive component A preferably is a malonate or a acetoacetate or a acetylacetone, or mixtures thereof preferably comprising at least 50 mole % malonate and wherein the component B comprises an unsaturated acryloyl or maleate functional group, preferably acryloyl. In a particularly preferred embodiment, component A comprises malonate and the cross-linkable composition comprises 0.1-10 wt % preferably 0.1-5, more preferably 0.2-3 and most preferably 0.5-1.5 wt % water (relative to total weight of the crosslinkable composition). Details of the preferred RMA systems that can be used are described in application PCT/EP2011/055463 and are herewith incorporated by reference.

The solvent in the cross-linkable composition can either be water or an organic solvent which may optionally comprise water. The crosslinkable composition preferably comprises an organic solvent wherein at least part of the solvent is a primary alcohol solvent and optional water. Good results are already obtained when the alcohol is present in the crosslinkable composition in an amount of at least at least 0.5 wt %. Sometimes the optimum amount may be more than 1, 2, 5, 7 or 10%. Generally the amount is at most 45, preferably at most 40 and more preferably less than 30 wt %, most preferably less than 20 wt % (relative to the total weight of the crosslinkable composition).

The crosslinkable composition—preferably comprises a primary alcohol, preferably a mono-alcohol having 1 to 20, preferably 1-10, more preferably 1-6 carbon atoms, preferably selected from the group of methanol, ethanol, n-propanol, n-butanol, n-amyl alcohol and butylglycol.

The Coating Composition

The invention further relates to a coating composition comprising the above described crosslinkable composition according to the invention and optional and preferably non-acidic additional binders, coating additives or fillers.

The coating composition preferably has a solids content between 55 and 100 and 0 to 45 wt % volatile organic components, and preferentially has a tack-free time at room temperature between 5 to 120 min, preferably 5 to 60 min, most preferably 10-45 min, and a time to double viscosity at least 30 minutes, preferably at least 1 hr most preferable at least 2 hours, more preferably 4 hours, even more preferably at least 8 hr, most preferably more than 16 hrs at room temperature. The coating composition has low VOC and excellent properties, in particular good potlife/drying balance as described above.

Depending upon the field of application, the coating compositions in accordance with the present invention may optionally contain one or more pigments, dyes and usual intermediary agents, additives and/or solvents. Examples of suitable inert organic solvents include esters, ketones, ethers, alcohols, aromatic and aliphatic hydrocarbons. Examples of suitable reactive organic solvents include dimethyl malonate, diethyl malonate, ethyl acetoacetate and 2-ethylhexyl acrylate (mono-acrylates should be counted as compound B in terms of total functionality and because they are chain stoppers should not be present in too high amounts).

As examples of preferred additives may be mentioned minor amounts of a co-binder not containing activated unsaturated or CH acidic groups, for example, cellulose acetate butyrate, acrylic, epoxy and polyester resins. As is known to one skilled in the art, these co-binders are commonly utilized in the coatings industry to modify certain properties such as drying speed and adhesion to substrates.

As mentioned earlier, the coating compositions in accordance with the present invention are suitable for a variety of coatings uses, for example, as paint, impregnating, sealing and bonding compositions. A preferred application is as a primer, pigmented topcoat, or clearcoat; the coating compositions may be applied to a substrate in any convenient manner such as, for example, by brushing, spraying or dipping. Suitable substrates include metals, wood, board, plastics and leather.

The curing of the above-described coating composition is preferably carried out at elevated temperatures above about 0° C. generally between about 5° C. and about 150° C. Preferred coating compositions based on RMA crosslinkable composition comprising components A, B and C as described are preferably cured at curing temperature is between 0 and 80° C., preferably 5 to 60° C., most preferably between 5 and 30° C.

The cross-linkable composition typically is a 2K system, comprising one part containing the cross-linkable components and another part containing a cross-linking catalyst composition which are mixed together shortly before use. The invention hence also relates to a process for preparing a base cross-linkable coating composition, which process comprises mixing of base crosslinkable components, preferably RMA crosslinkable components A and B as described above and optional coating additives, with the catalyst composition according to the invention.

The invention further relates to a process for preparing a cross-linked coating comprising applying a layer of the crosslinkable coating composition according to the invention on a substrate and curing the coating composition by evaporation of carbon dioxide from the layer. As described, the catalyst this suitable for low temperature curing of the coating composition, preferably between 0 and 80° C., preferably 5 to 60° C., most preferably between 5 and 30° C. The coating has a good hardness properties and short dry to touch time. The invention hence also relates to the coating and the coated substrate obtainable by the process according to the invention.

EXAMPLES

The foregoing more general discussion of the present invention will be further illustrated by the following specific examples, which are exemplary only.

The gel time is the time at which the sample is gelled and has lost all fluidity which was determined by making a mixture of the components and the latent base catalyst, placing 10 ml sample of the mixture in a 20 ml closed glass container (50% headspace) and keeping the sample at room temperature (23° C.) until gelation occurs. The container was tilted at regular time intervals and visually inspected to check whether or not the sample still flowed. The gel time is the time at which the container could be held upside down without flow of the sample.

Dust-dry and tack-free times were measured according to the so-called TNO method with a wad of cotton-wool. Dust-dry time means the time needed for the coating after dropping the wad on the surface of the coating and after leaving it there for 10 second, to get no residue of the wool-cotton sticking onto the surface after blowing away the wad. For tack-free time the same holds but now a weight load of 1 kg is applied on the wad for 10 seconds.

Persoz pendulum hardness was measured in a climatized room at 23° C., and 55+/−5% relative humidity.

Viscosities were measured with a TA Instruments AR2000 Rheometer, using a cone and plate setup (cone 4 cm 1°) at 1 Pa stress. Tube and ball viscometry for determining pot life: A glass test tube (length 12 cm, diameter 13 mm) was filled with a stainless steel ball of 12 mm diameter, and the formulation to be studied to leave a very limited head space, and closed. Time was recorded for the ball to fall and pass a distance of 5 cm when the tube was tilted vertically. An average was taken over 2 measurements. Relative viscosities are determined relative to the starting condition by dividing the time found, by the time found for the first measurement after mixing.

Reported molecular weights were measured by GPC in THF, and expressed in polystyrene equivalent weights.

The following abbreviations were used for chemicals used in the experiments: DiTMPTA is di-(trimethylolpropane) tetraacrylate (obtained from Aldrich (MW=466 g/mole)), IPA is isopropanol, MeAcac is methylacetoacetate, DEC is diethylcarbonate, MEK is methyl ethyl ketone (2-butanone), BuAc is butylacetate, TBAH is tetrabutylammonium hydroxide, AbC is ammonium bicarbonate from Acros (98% pure).

Preparation of Malonate Polyester A

Into a reactor provided with a distilling column filed with Raschig rings were brought 17.31 mol of neopentyl glycol, 8.03 mol of hexahydrophthalic anhydride and 0.0047 mol of butyl stannoic acid. The mixture was polymerised at 240° C. under nitrogen atmosphere to an acid value of 0.2 mg KOH/g, cooled down to 130° C. Subsequently, 10.44 mol of diethylmalonate was added, and the reaction mixture was heated to 170° C., to remove ethanol, in the later stages under reduced pressure. The material was cooled down and diluted with 420 g of butyl acetate to a nominal 90% solid content. The final resin had an acid value of 0.3 mg KOH/g solids, an OH value of 20 mg KOH/g solids, and a weight average molecular weight of 3400 Da.

Syntheses of the Blocked Catalysts

C1:

147.1 g of a 40% TBAH solution in water was mixed with 34.0 g diethyl carbonate (DEC) and 43.6 g ethanol, and 15.8 grams of water. The reaction mixture was stirred overnight to yield a clear solution. Titration in 2-propanol with aqueous HCl revealed complete blocking into the carbonated species, with a concentration of 0.80 meq catalyst per g solution.

C2:

178.1 g of a 40% TBAH solution in water was mixed with 40.5 g DEC and 38.2 g isopropanol. The reaction mixture was stirred overnight to yield a clear solution. Titration in 2-propanol with aqueous HCl indicated complete blocking, and a concentration of active species of 0.87 meq catalyst per g solution.

Catalyst Solutions S1-S6, Comparative Catalyst Solutions CS1 and CS2

Catalyst solutions were prepared by formulating catalyst preparation C1 and C2 with various levels of ammonium bicarbonate, and (co)solvents, as tabulated below (amounts in gram).

| code | CS1 | S1 | S2 | S3 |
|---|---|---|---|---|
| Catalyst C1 | 29.7 | 22.7 | 22.5 | 33.4 |
| ammonium bicarbonate | 0.00 | 0.36 | 0.71 | 2.11 |
| $H_2O$ | 12.9 | 9.8 | 9.7 | 14.5 |

-continued

| Code | CS2 | S4 | S5 | S6 |
|---|---|---|---|---|
| Catalyst C2 | 49.95 | 49.96 | 49.93 | 49.93 |
| ammonium bicarbonate | 0.00 | 0.86 | 1.72 | 3.43 |
| $H_2O$ | 7.8 | 7.8 | 7.8 | 7.8 |

Preparation of Triethylamine Bicarbonate T1

A flask was charged with 20 grams of triethylamine, 15.6 gram ammonium bicarbonate and 75 gram water. This mixture was stirred for 5 days at RT and was daily purged with nitrogen. Finally the last ammonia formed was removed by applying vacuum (25 mbar) at ambient temperature during 4 hours. During the preparation, the smell of ammonia was clearly present and two equivalence points were detected. After the vacuum treatment, titration with hydrochloric acid revealed only one equivalence point. The load of triethylamine bicarbonate ($Et_3NH^+\ HCO_3^-$) was 1.48 mmol/gram solution.

Comparative Formulation Example 1

A lacquer was formulated with 15.0 g of malonate polyester A, 6.6 g of DiTMPTA, 1.5 g of catalyst solution CS1, and thinned down with 2.3 g of a MEK/BuAc mixture (1:1 by volume), to end up with a formulation of 750 mPas viscosity at a solids content of 79%. This formulation contained an estimated water level of 3.1 wt %, an estimated ethanol level of 1.1 wt %; the catalyst level was 50 µeq/gram of reactive components expected as solid end product.

Formulation Examples 1-2

Lacquers were formulated with 15.0 grams of malonate polyester A, 6.6 g of DiTMPTA, 1.5 g of catalyst solution S1 or S2, and thinned down with 2.3 g of MEK/BuAc mixture (1:1 by volume), to end up with a formulation of 750 mPas viscosity at a solids content of 79%. This formulation contained an estimated water level of 3.1 wt %, an estimated ethanol level of 1.1 wt %, and an amount of ammonium bicarbonate of 25 mole % (1) or 50 mole % (2) relative to the equivalents of base catalyst added catalyst added (50 µeq/g solids).

Formulations 1 and 2, and comparative formulation 1 were tested for their behavior in the pot by measuring gel time, and upon application by drawdown of these formulations onto glass to obtain a dry film thickness of 45-55 µm. Drying was followed as dust-dry and tack-free limits (TNO cotton ball testing), as was hardness development (Persoz hardness) upon cure at RT as well as that following an initial flash-off period of 10 minutes followed by a forced dry step of 45 minutes at 60° C., and subsequent RT storage. Results can be found in table A.

It can be seen that the addition of ammonium bicarbonate at the levels indicated results in a significant increase in gel time, while maintaining the drying times at the very fast level also found in the comparative example. Moreover, a faster buildup of Persoz hardness is observed (>5<20 means more than 5, less than 20 hours).

TABLE A

| Gel time and cure behaviour | | | |
|---|---|---|---|
| | Comp 1 | Ex 1 | Ex 2 |
| mole % AbC (on base catalyst) | 0 | 25 | 50 |
| gel time (h) | >5 <20 | >24 | >24 |

TABLE A-continued

| Gel time and cure behaviour | | | |
|---|---|---|---|
| | Comp 1 | Ex 1 | Ex 2 |
| TNO-drying (min) | | | |
| dust-dry | 10' | 10' | 10' |
| tack-free | 15' | 15' | 15' |
| Persoz hardness (sec) | | | |
| RT cure | | | |
| 1 day | 47 | 88 | 82 |
| 7 days | 70 | 120 | 119 |
| 14 days | 85 | 125 | 136 |
| 3 weeks | 115 | 131 | 139 |
| 45' 60° C. - RT cure | | | |
| 1 hour | 37 | 155 | 113 |
| 1 day | 47 | 146 | 115 |
| 1 week | 70 | 155 | 127 |
| 2 weeks | 87 | 168 | 158 |
| 3 weeks | 98 | 175 | 197 |

Further experiments zoom in on the advantages that can be created through the use of ammonium bicarbonate.

Formulation examples 3-5 were prepared by mixing malonate polyester A (15 g), diTMPTA (6.6 g), 6.8 g of a MEK/BuAc mixture (1:1 by volume), and amounts of catalyst solutions S1-S3 with increasing levels of ammonium bicarbonate (relative to TBA catalyst species), and compared with a similar comparative formulation 2 (formulated with catalyst solution CS1, not containing ammonium bicarbonate) according to the table B. These formulations all contained about 50 µeq/g solids active base, a water level of approximately 2.7 wt %, and 0.9 wt % ethanol, and ad a viscosity around 80 mPas.

TABLE B

| Code | Comp 2 | Ex 3 | Ex 4 | Ex 5 |
|---|---|---|---|---|
| catalyst solution | 1.54 g CS1 | 1.54 g S1 | 1.57 g S2 | 1.62 g S3 |
| AbC mole % relative to TBA catalyst | 0 | 25 | 50 | 100 |

The pot life was measured with the tube and ball method, and the viscosities, normalized relative to the starting viscosity as 1, are expressed in table C:

TABLE C

| code time (h) | comp 2 0% abc | ex 3 25% abc | ex 4 50% abc | ex 5 100% abc |
|---|---|---|---|---|
| 0 | 1.0 | 1.0 | 1.0 | 1.0 |
| 1 | 1.0 | 1.0 | 1.0 | 1.2 |
| 2 | 1.0 | 0.8 | 1.2 | 1.2 |
| 3 | 1.2 | 1.0 | 1.2 | 1.2 |
| 4 | 1.3 | 1.2 | 1.3 | 1.3 |
| 5 | 1.7 | 1.2 | 1.3 | 1.3 |
| 6 | 2.0 | 1.2 | 1.3 | 1.3 |
| 8 | 2.7 | 1.3 | 1.3 | 1.3 |
| 10 | 3.3 | 1.3 | 1.3 | 1.3 |
| 12 | 6.0 | 1.5 | 1.5 | 1.3 |
| 20 | | 2.0 | 1.5 | 1.3 |
| 30 | | 2.2 | | 1.3 |

It can be seen that the time to doubling viscosity, being around 6 hours in the case of comparative example 2, is extended to significantly higher values: with 25% AbC, it is already 20 hours, higher levels increasing potlife significantly beyond that level.

Initial pot life without AbC in these systems is a variable affected by levels of water and primary alcohols (maintained constant in the previous comparison), but also the level of acetoacetate components as secondary donor group type next to malonates: acetoacetates are more critical in pot life.

Example formulations 6-10 were prepared along the same lines as described above (malonate polyester A, diTMPTA, varying levels of methylacetoacetate and thinning solvent mixture MEK/BuAc to obtain a viscosity of around 80 mPas, and with a level of AbC at 25% relative relative to TBA using catalyst solution S1 (catalyst concentrations at 50 µeq/g intended solids). Compositions are given in table D.

TABLE D

| Code | Ex 6 | Ex 7 | Ex 8 | Ex 9 | Ex 10 |
|---|---|---|---|---|---|
| malonate polyester A/g | 15.0 | 15.0 | 15.0 | 15.0 | 15.0 |
| di-TMPTA/g | 6.6 | 7.3 | 8.2 | 9.4 | 11.0 |
| MeAcAc/g | 0.0 | 0.48 | 1.03 | 1.90 | 2.89 |
| MEK:BuAc (1:1 (vol))/g | 6.7 | 6.7 | 6.5 | 4.0 | 3.60 |
| catalyst solution S1/g | 1.52 | 1.61 | 1.72 | 1.87 | 2.07 |
| wt % water (on total) | 3.5% | 3.5% | 3.6% | 4.0% | 4.1% |
| wt % EtOH (on total) | 0.8% | 0.8% | 0.8% | 0.9% | 1.0% |

Comparative example formulations 3-7 were prepared along the same lines as described above (malonate polyester A, diTMPTA, varying levels of methylacetoacetate and thinning solvent mixture MEK/BuAc to obtain a viscosity of around 80 mPas, using comparative catalyst solution CS1, no AbC added (catalyst concentrations at 50 µeq/g intended solids). Compositions are given in table E.

TABLE E

| code | Comp 3 | Comp 4 | Comp 5 | Comp 6 | Comp 7 |
|---|---|---|---|---|---|
| malonate polyester A/g | 15.0 | 15.0 | 15.0 | 15.0 | 15.0 |
| di-TMPTA/g | 6.60 | 7.30 | 8.20 | 9.40 | 11.00 |
| MeAcAc/g | 0.00 | 0.47 | 1.06 | 1.81 | 2.82 |
| MEK:BuAc (1:1 (vol))/g | 6.70 | 6.70 | 6.50 | 4.00 | 3.60 |
| catalyst CS1/g | 1.52 | 1.61 | 1.72 | 1.87 | 2.07 |
| wt % water (on total) | 3.5% | 3.5% | 3.6% | 4.0% | 3.8% |
| wt % EtOH (on total) | 0.8% | 0.8% | 0.8% | 0.9% | 0.9% |

The pot life of examples formulations 6-10, and comparative example formulations 3-7, was measured with the tube and ball method, and the viscosities, normalized relative to the starting viscosity as 1, are expressed in table F:

TABLE F

| Code | | | | | | | | | | |
|---|---|---|---|---|---|---|---|---|---|---|
| | Comp 3 | Ex 6 | Comp 4 | Ex 7 | Comp 5 | Ex 8 | Comp 6 | Ex 9 | Comp 7 | Ex 10 |
| mole % AbC on TBA base | | | | | | | | | | |
| | 0 | 25 | 0 | 25 | 0 | 25 | 0 | 25 | 0 | 25 |
| mole % acetoacetate on total donor CH2 groups | | | | | | | | | | |
| time (h) | 0 | 0 | 10 | 10 | 20 | 20 | 30 | 30 | 40 | 40 |
| 0 | 1.0 | 1.0 | 1.0 | 1.0 | 1.0 | 1.0 | 1.0 | 1.0 | 1.0 | 1.0 |
| 1 | 1.0 | 1.0 | 1.0 | 1.0 | 1.0 | 1.0 | 1.5 | 1.0 | 2.0 | 1.3 |
| 2 | 1.0 | 1.0 | 1.0 | 1.0 | 1.0 | 1.0 | 2.5 | 1.0 | 3.0 | 2.0 |
| 3 | 1.0 | 1.0 | 1.0 | 1.0 | 1.3 | 1.0 | 4.0 | 1.0 | 6.0 | 4.0 |
| 4 | 1.0 | 1.0 | 1.3 | 1.6 | 1.5 | 1.6 | 5.0 | 2.0 | 10 | 4.8 |
| 5 | 1.3 | 1.3 | 1.3 | 1.6 | 2.5 | 2.0 | 6.0 | 2.8 | 14 | 5.0 |
| 6 | 1.3 | 1.3 | 1.3 | 1.6 | 3.0 | 2.0 | 9.0 | 2.8 | 25 | 5.3 |
| 8 | 2.0 | 1.3 | 2.0 | 1.6 | 4.0 | 2.0 | 17 | 3.0 | | 7.0 |
| 9 | 2.0 | 1.3 | 2.0 | 1.6 | 4.3 | 2.4 | 21 | 3.0 | | 7.5 |
| 12 | 2.2 | 1.5 | 3.0 | 1.6 | 5.0 | 2.6 | | 4.0 | | 10 |
| 22 | 3.0 | 1.5 | 4.0 | 1.6 | 9.0 | 2.6 | | 6.0 | | 17 |
| 28 | 3.3 | 1.5 | 4.3 | 2.4 | 12 | 3.2 | | 8.0 | | |

It can be observed in the comparative examples that the pot life (to viscosity doubling) decreases with increasing levels of acetoacetates to values in the order of one hours when using 40% acetoacetates; it can also be observed that the use of AbC levels of only 25% on catalyst leads to a doubling or more of this pot life, also in the formulations containing acetoacetates besides malonates.

The next examples illustrate the impact of varying levels of AbC on pot life in formulations quite critical in their pot life.

Example formulations 11-13, and comparative example formulation 8, were prepared as described above, and formulated with catalyst solutions S4-6, or CS2. Compositions are given in table G. All compositions contained 20 mole % acetoacetate groups on total CH2 donor groups, and 50 µeq/g solids of catalyst. Water levels were 2.3%, IPA levels 0.6%.

TABLE G

| Code | Comp 8 | Exp 11 | Exp 12 | Exp 13 |
|---|---|---|---|---|
| malonate polyester A/g | 15.0 | 15.0 | 15.0 | 15.0 |
| di-TMPTA/g | 8.30 | 8.30 | 8.30 | 8.30 |
| MeAcAc/g | 1.00 | 1.00 | 1.00 | 1.00 |
| MEK:BuAc (1:1) (vol)/g | 6.30 | 6.30 | 6.30 | 6.30 |
| catalyst solution/g | CS2/1.49 | S4/1.54 | S5/1.58 | S6/1.67 |
| mole % AbC on base cat | 0 | 25 | 50 | 100 |

The pot life of examples formulations 11-13, and comparative example formulation 8, was measured with the tube and ball method, and the viscosities, normalized relative to the starting viscosity as 1, are expressed in table H:

TABLE H

| Time (h) | Comp 9 0% abc | Ex 11 25% abc | Ex 12 50% abc | Ex 13 100% abc |
|---|---|---|---|---|
| 0 | 1 | 1 | 1 | 1 |
| 1 | 1.6 | 1.2 | 1 | 1 |
| 1.5 | 2.4 | 1.6 | 1 | 1 |
| 2 | 7.2 | 4 | 1 | 1 |
| 2.5 | 29.6 | 8.8 | 1.2 | 1 |
| 3 | | 12 | 1.4 | 1 |
| 3.5 | | | 1.6 | 1 |
| 4 | | | 1.6 | 1 |
| 5 | | | 1.8 | 1 |
| 6 | | | 1.8 | 1 |

TABLE H-continued

| Time (h) | Comp 9 0% abc | Ex 11 25% abc | Ex 12 50% abc | Ex 13 100% abc |
|---|---|---|---|---|
| 7 | | | 1.8 | 1.2 |
| 10 | | | 3.2 | 1.6 |
| 11 | | | 4 | 2.4 |
| 12 | | | 4.8 | 3.2 |
| 13 | | | 5.6 | 3.2 |
| 24 | | | 9.6 | 3.2 |
| 48 | | | 12.8 | 4.8 |

Time to viscosity doubling is extended from about an hour in comparative example 9, to about 8 hours at 50% AbC added, and being extended even further at 100% AbC relative to catalyst.

Comparative Example 10

A formulation was made, blending 15.05 g of malonate polyester A, 6.61 g of DiTMPTA, 4.4. g of a 1:1 by mass mixture of MEK and BuAc, and 0.68 g of a 7.9 wt % aqueous solution of ammonium bicarbonate (corresponding to 0.034 mmole/g solids). When applied as a film, the coating remains tacky, and does not appear to exhibit a curing reaction. This proves that the role of AbC is clearly different from that of the cure initiating quaternary ammonium blocked base catalysts.

Formulation example 14 was formulated to allow a comparison with comparative example formulation 2, by mixing 15 g malonate polyester A, 6.6 g DiTMPTA, 7.1 g MEK/BuAc 1:1 by mass, 1.2 g of catalyst solution C2, 0.17 g of triethylamine bicarbonate solution T1, 0.24 g water and 0.22 g ethanol, to have water and ethanol levels in this formulation of 2.8 and 0.9 wt % respectively. Pot life was determined by following viscosity using the tune and ball method; results are indicated in table I below, alongside of the results of comparative example formulation 2. The amount of triethylamine bicarbonate is estimated to be 25 mole % relative to the amount of activating blocked TBA catalyst (50 μeq/g solids). It can be seen that the use of the triethylamine bicarbonate extends time to doubling of viscosity from about 6, to more than 48 hours.

TABLE I

| | relative viscosity development: | |
|---|---|---|
| code time (h) | comp 2 | ex 14 |
| 0 | 1.0 | 1.0 |
| 1 | 1.0 | 1.0 |
| 2 | 1.0 | 1.0 |
| 3 | 1.2 | 1.0 |
| 4 | 1.3 | 1.0 |
| 5 | 1.7 | 1.0 |
| 6 | 2.0 | 1.0 |
| 8 | 2.7 | 1.0 |
| 10 | 3.3 | 1.0 |
| 12 | 6.0 | 1.0 |
| 20 | | 1.2 |
| 30 | | |
| 48 | | 1.4 |

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A crosslinkable composition comprising
   a. 0.1-99 wt % of at least one crosslinkable component that is crosslinkable under the action of a base catalyst, all wt % herein being relative to the crosslinkable composition,
   b. a first carbonate salt according to Formula 1 as latent base crosslinking catalyst,

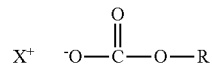

Formula 1 wherein $X^+$ represents a non-acidic cation and wherein R is hydrogen, alkyl, or aralkyl group, wherein non-acidic means a pKa of at least 11.5 relative to water, and
   c. a second carbonate salt according to Formula 2 as potlife extender:

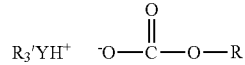

Formula 2 wherein Y is N or P and wherein each R' is hydrogen, a substituted or unsubstituted alkyl, aryl or aralkyl group, and R is hydrogen, alkyl, or aralkyl group, wherein the second carbonate is present in an amount of at least 5 mole % and at most 500 mole % relative to the molar amount of the first carbonate, and wherein the cation of the second carbonate salt has a pKa of less than 11.5 relative to water.

2. The crosslinkable composition according to claim 1, wherein the latent base crosslinking catalyst is present in an amount of 0.001-0.3 meq/g solids, meq latent base relative to dry total weight of the crosslinkable composition.

3. The crosslinkable composition according to claim 1, further comprising 0.1-70 wt % of an organic solvent wherein at least 0.5 wt %, relative to total weight of the crosslinkable composition, is a primary alcohol.

4. The crosslinkable composition according to claim 1, further comprising 0.1-10 wt % water.

5. The crosslinkable composition according to claim 1, further comprising 0.1-70 wt % of an organic carbonate component according to formula RO—C(=O)O—R wherein R is an alkyl.

6. The crosslinkable composition according to claim 1, wherein the at least one crosslinkable component comprises reactive components A and B, each comprising at least 2 reactive groups, wherein the at least 2 reactive groups of component A are acidic protons C—H in activated methylene or methine groups and the at least 2 reactive groups of component B are activated unsaturated groups C=C.

7. The crosslinkable composition according to claim 6, wherein the reactive component A is a malonate or a acetoacetate or a acetylacetone, or mixtures thereof, and wherein the component B comprises an unsaturated acryloyl or maleate functional group.

8. The crosslinkable composition according to claim 7, wherein the reactive component A comprises at least 50 mole % malonate.

9. A coating composition comprising the crosslinkable composition according to claim 1, and additional binders, coating additives or fillers.

10. A method for preparing a cross-linked coating comprising applying a layer of the crosslinkable coating composition according to claim 9 on a substrate and curing the coating composition by evaporation of carbon dioxide from the layer.

11. A catalyst composition for use as a latent base catalyst system in crosslinkable compositions, composed of
   a. A latent base catalyst, wherein said latent base catalyst is a first carbonate salt according to Formula 1:

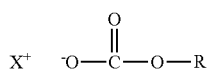

Formula 1 wherein $X^+$ represents a non-acidic cation and wherein R is hydrogen, alkyl, or aralkyl group, wherein non-acidic means a pKa of at least 11.5 relative to water, and
   b. a potlife extender, wherein said potlife extender is a second carbonate salt according to Formula 2:

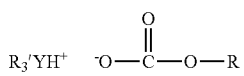

Formula 2 wherein Y is N or P, wherein each R' is hydrogen, a substituted or unsubstituted alkyl, aryl or aralkyl group, and wherein R is hydrogen, alkyl, or aralkyl group, wherein the second carbonate is present in an amount of at least 5 mole % and at most 500 mole % relative to the molar amount of the first carbonate, and wherein the cation of the second carbonate salt has a pKa of less than 11.5 relative to water and an organic solvent in an amount of 0.1-99.8 wt %, wherein at least part of the organic solvent is a primary alcohol.

12. The catalyst composition according to claim 11, further comprising an organic carbonate component according to formula RO—C(=O)O—R wherein R is an alkyl.

13. The catalyst composition according to claim 11, wherein the cation $X^+$ is a quaternary ammonium or phosphonium carbonate salt according to formula 3,

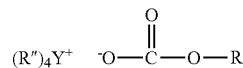

Formula 3 wherein Y represents N or P, and wherein each R" is a same or different alkyl, aryl or aralkyl group.

14. The catalyst composition according to claim 11, wherein the anions of the first and second carbonate salts are bicarbonate, methocarbonate or ethocarbonate.

15. The catalyst composition according to claim 11, wherein the cation in the second carbonate salt is a protonated amine, protonated ammonia or a protonated volatile tertiary amine, and wherein the anion in the second carbonate is a bicarbonate or an alkylcarbonate.

16. The catalyst composition according to claim 11, wherein the second carbonate salt is ammonium bicarbonate $NH_4HCO_3$ or a bicarbonate of a protonated volatile tertiary amine.

17. The catalyst composition according to claim 11, further comprising as a catalyst storage stability improver an organic carbonate component according to formula RO—C(=O)O—R wherein R is an alkyl, wherein the molar ratio of this organic carbonate component to the first carbonate salt is 0.01-50.

18. The catalyst composition according to claim 11, further comprising water in amount between 0.1-10 wt % relative to total weight of the catalyst composition.

19. The catalyst composition of claim 11, comprising
   a. 0.1-50 wt % of the first carbonate salt
   b. 0.1-50 wt % of the second carbonate salt and,
   c. 0.1-99.8 wt % of the organic solvent.

20. A method for curing a coating composition comprising the catalyst composition according to claim 11 as a crosslinking catalyst, wherein said method comprises curing the coating composition at a temperature between 0 and 80° C.

* * * * *